(12) United States Patent
Qin

(10) Patent No.: US 9,841,794 B2
(45) Date of Patent: Dec. 12, 2017

(54) PORTABLE ELECTRONIC COMPUTER

(75) Inventor: Biao Qin, Guangdong (CN)

(73) Assignee: Shenzhen Qin Bo Core Technology Development Co., Ltd., Shenzhen, Guangdong Province (CN)

( * ) Notice: Subject to any disclaimer, the term of this patent is extended or adjusted under 35 U.S.C. 154(b) by 322 days.

(21) Appl. No.: 12/994,846

(22) PCT Filed: Jan. 13, 2009

(86) PCT No.: PCT/CN2009/070115
§ 371 (c)(1),
(2), (4) Date: Nov. 26, 2010

(87) PCT Pub. No.: WO2009/152697
PCT Pub. Date: Dec. 23, 2009

(65) Prior Publication Data
US 2011/0075340 A1    Mar. 31, 2011

(30) Foreign Application Priority Data

Jun. 18, 2008 (CN) .......................... 2008 1 0067794

(51) Int. Cl.
*G06F 1/20* (2006.01)
*G06F 1/16* (2006.01)

(52) U.S. Cl.
CPC ............ *G06F 1/203* (2013.01); *G06F 1/1616* (2013.01); *G06F 1/1635* (2013.01); *G06F 1/1654* (2013.01); *G06F 1/1681* (2013.01); *G06F 1/1683* (2013.01)

(58) Field of Classification Search
CPC .... G06F 1/1626; G06F 1/1656; G06F 1/1616; G06F 1/1624; H04M 1/0214

USPC ............................ 361/679.09, 679.3, 679.06
See application file for complete search history.

(56) References Cited

U.S. PATENT DOCUMENTS

| | | | |
|---|---|---|---|
| 4,288,836 A * | 9/1981 | Thornburg et al. ........... 200/600 |
| 5,085,394 A * | 2/1992 | Torii ............................. 248/455 |
| 5,168,426 A * | 12/1992 | Hoving et al. ........... 361/679.09 |
| 5,200,913 A * | 4/1993 | Hawkins et al. ........ 361/679.09 |
| 5,255,214 A * | 10/1993 | Ma ........................... 361/679.09 |
| 5,262,759 A * | 11/1993 | Moriconi et al. ........ 361/679.29 |
| 5,267,123 A * | 11/1993 | Boothroyd et al. ..... 361/679.09 |
| 5,276,589 A * | 1/1994 | Bartlett et al. ........... 361/679.06 |
| 5,291,370 A * | 3/1994 | Yanagisawa et al. ... 361/679.09 |
| 5,378,159 A * | 1/1995 | Renn ................... H01R 12/721 439/377 |

(Continued)

*Primary Examiner* — Jinhee Lee
*Assistant Examiner* — Abhishek Rathod
(74) *Attorney, Agent, or Firm* — Novoclaims Patent Services LLC; Mei Lin Wong

(57) ABSTRACT

This invention puts forward a kind of mobile computer, which includes a host with a panel display on it, a screen cover and a keyboard. The keyboard is set on the screen cover. The connection between the host and the screen cover adopts staff connecting structure or slide block and sliding groove connecting structure, and the host can be folded with the screen cover and opened to stand up askew on the screen cover conveniently. The best heat transfer effect of the wall of the host shell is adopted, when the host stands up, to improve heat transfer and decrease the host thickness. The screen cover can be removed and installed from the host conveniently. Setting battery on the screen cover, users can replace the battery conveniently.

13 Claims, 4 Drawing Sheets

(56) References Cited

U.S. PATENT DOCUMENTS

| | | | |
|---|---|---|---|
| 5,466,170 A * | 11/1995 | Pavek | G06K 13/08 439/31 |
| 5,548,478 A * | 8/1996 | Kumar et al. | 361/679.27 |
| 5,644,469 A * | 7/1997 | Shioya et al. | 361/679.06 |
| 5,742,475 A * | 4/1998 | Riddiford | 361/679.09 |
| 5,888,087 A * | 3/1999 | Hanson | B60R 16/0231 439/297 |
| 6,266,236 B1 * | 7/2001 | Ku et al. | 361/679.27 |
| 6,384,811 B1 * | 5/2002 | Kung et al. | 345/168 |
| 6,512,670 B1 * | 1/2003 | Boehme et al. | 361/679.29 |
| 6,590,547 B2 * | 7/2003 | Moriconi et al. | 345/30 |
| 6,714,403 B2 * | 3/2004 | Furuki et al. | 361/679.09 |
| 6,778,196 B2 * | 8/2004 | Nakamura | 361/679.27 |
| 6,826,043 B2 * | 11/2004 | Chang | 361/679.27 |
| 6,829,140 B2 * | 12/2004 | Shimano et al. | 361/679.09 |
| 6,937,468 B2 * | 8/2005 | Lin et al. | 361/679.41 |
| 7,107,084 B2 * | 9/2006 | Duarte et al. | 455/575.3 |
| 7,203,058 B2 * | 4/2007 | Hong | 361/679.06 |
| 7,283,355 B2 * | 10/2007 | Han | 361/679.55 |
| 7,586,743 B2 * | 9/2009 | Lin | 361/679.55 |
| 7,690,576 B2 * | 4/2010 | Ladouceur et al. | 235/486 |
| 7,719,826 B1 * | 5/2010 | Chang et al. | 361/679.17 |
| 7,733,637 B1 * | 6/2010 | Lam | 361/679.11 |
| 7,934,689 B2 * | 5/2011 | Chiu et al. | 248/222.11 |
| 8,249,676 B2 * | 8/2012 | Ladouceur et al. | 455/575.4 |
| 2002/0102946 A1 * | 8/2002 | SanGiovanni | 455/90 |
| 2003/0222149 A1 * | 12/2003 | Solomon et al. | 235/472.01 |
| 2004/0042171 A1 * | 3/2004 | Takamatsu et al. | 361/687 |
| 2004/0080908 A1 * | 4/2004 | Wang et al. | 361/687 |
| 2004/0114315 A1 * | 6/2004 | Anlauff | 361/681 |
| 2004/0125554 A1 * | 7/2004 | DeLuga | 361/683 |
| 2004/0169995 A1 * | 9/2004 | Ghosh et al. | 361/683 |
| 2004/0212954 A1 * | 10/2004 | Ulla et al. | 361/680 |
| 2005/0128676 A1 * | 6/2005 | Homer et al. | 361/300 |
| 2005/0168925 A1 * | 8/2005 | Fang et al. | 361/683 |
| 2005/0243504 A1 * | 11/2005 | Wong et al. | 361/683 |
| 2006/0001743 A1 * | 1/2006 | Lee | 348/207.1 |
| 2006/0038795 A1 * | 2/2006 | Lee | 345/173 |
| 2006/0039112 A1 * | 2/2006 | Minamitani et al. | 361/699 |
| 2006/0077622 A1 * | 4/2006 | Keely et al. | 361/681 |
| 2006/0133024 A1 * | 6/2006 | Kim et al. | 361/683 |
| 2006/0162901 A1 * | 7/2006 | Aizono et al. | 165/80.4 |
| 2007/0030634 A1 * | 2/2007 | Maskatia | 361/683 |
| 2007/0217131 A1 * | 9/2007 | Kehr | 361/681 |
| 2007/0242421 A1 * | 10/2007 | Goschin et al. | 361/681 |
| 2008/0081505 A1 * | 4/2008 | Ou et al. | 439/374 |
| 2008/0144293 A1 * | 6/2008 | Aksamit et al. | 361/727 |
| 2008/0180893 A1 * | 7/2008 | Shimamoto et al. | 361/680 |
| 2008/0266767 A1 * | 10/2008 | Nicholas et al. | 361/681 |
| 2008/0297995 A1 * | 12/2008 | Lai | 361/680 |
| 2009/0009949 A1 * | 1/2009 | Lai et al. | 361/681 |
| 2009/0117953 A1 * | 5/2009 | Oh | 455/575.1 |
| 2010/0014235 A1 * | 1/2010 | Huang et al. | 361/679.09 |
| 2010/0053877 A1 * | 3/2010 | Hsu et al. | 361/679.27 |

* cited by examiner

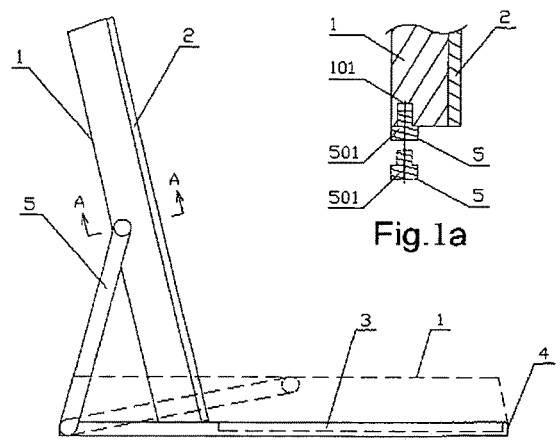
Fig. 1a
Fig. 1
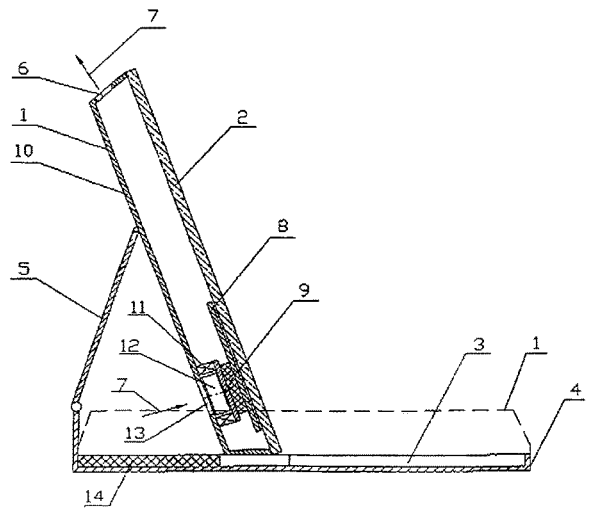
Fig. 2

PORTABLE ELECTRONIC COMPUTER

BACKGROUND OF THE PRESENT INVENTION

Field of Invention

The present invention relates to the mobile electronic apparatus, especially the mobile computer which is composed of a panel display (LCD panel), a motherboard, hard disc and keyboard.

Description of Related Arts

Higher and higher requirement is needed for the mobile computer (notebook computer), not only the performance should be higher and the weight should be lighter, but also the thickness should be thinner especially (the thickness of now notebooks is no less than 30 mm), people want the notebook compute to be a real book. As the semiconductor integration technology and the electronic manufacture technology improved, the area and room of the motherboard and the components (including CPU, GPU, memory and so on) on the motherboard are decreased very much. The solid state disc (SSD) will cut down the hard disc's dimension, especially the thickness very much. So the obstacle of cutting down the mobile computer's thickness further is not the thicknesses of the motherboard and hard disc, but the dimension (especially thickness) of the heat sink for CPU or GPU and other components. And the structure of now notebook isn't fit for the heat dissipation.

The notebook's structure now is: The display stands up, the host lies horizontally, and the keyboard is on the surface of the host. Except the display, all components, such as the motherboard, batteries and hard disc, are in the host, so the most components producing heat are in the host. According to the nature convection theory, the heat dissipating effect of lying board is the least. Because the computer generally works on the wooden desk of low heat conduction, sometimes maybe on the textile of lower heat conduction, so the nether shell of the host can't be used as heat dissipating side.

So the notebooks now use a fan and fins, it takes room of the fan and fins, and room of the air channel which is used for air inlet and outlet. The heat dissipation, thickness, the performance and cost are inconsistent factors to each other, the designer should make out a hard choice. In addition, notebook's users now can't choose or replace batteries of different capacity.

SUMMARY OF THE PRESENT INVENTION

Base on being in favor of the heat dissipation efficiency, the present invention puts forward a new structure of mobile computer, which combines the host and display in one, and makes use of the best effect of radiation heat transfer and air convection (nature) heat transfer of the shell wall when the host stands up. It reduces the dimension, especially the thickness, of the heat sink for CPU or GPU. It even can save the fan and fins. It improves effectually heat dissipating capacity of the whole computer, and decreases the computer's thickness and the manufacturing cost. The users can choose and replace batteries of different capacities.

The blue print of the present invention is as follow: the computer includes a host, a screen cover and a keyboard; the host is flat with a panel display on it, and there are a motherboard and a hard disc in it. The characteristics of the present invention are: The keyboard is set on the inside of the screen cover; The host and the screen cover are connected by a linking device; When the host stands up, the screen cover lies, the host stands up askew on the inside of the screen cover, the downside of the host stands in the inside of the screen cover, which makes the vertical line of the center of gravity being within the screen cover.

According to the heat transfer theory, when a wall stands up, the effect of the natural convection heat transfer is the best; and because there is no shelter in front of the wall when the host stands up, the effect of the radiation heat transfer is the best. A vertical wall of 26×30 cm$^2$, and when the difference in temperature is 30 □, the heat dissipating capacity can be up to 20 W.

Combining the host and display in one, the host stands up, and the outside wall of the host shell is an effectual heat dissipating surface. If the flux of heat of the CPU and GPU, and the other components on the motherboard is less than 20 w, we can save the fan and fins (heat sink). When the heat flux of CPU and GPU, and the other components on the motherboard is higher, because the outside wall takes on plenty of heat dissipation, the size of heat sink (the fan and fins) can be reduced so much, that the host thickness can be decreased very much.

The advantages when the host is set to stand up also include: 1. the spare room in the host is used to produce a pump effect like a chimney, which improves the air convection in the host, to discharge the heat in the host and increase the heat dissipation of other components in the host; 2. the air inlet for heat dissipation can not be blocked easily.

In the now notebooks, the host lies horizontally, if the air inlet is set on the downside wall of the shell, it will be blocked easily. If the air inlet is set on the sidewall, although it is not blocked easily, when air goes into the centrifugal fan, there is a 90° bending, the air loss is too much, and the inlet channel increases the host thickness. The keyboard is on the host, It is not suitable to set the air inlet there specially, so usually there are many ostioles opened under each key, this kind structure first increases the thickness to make sure the inlet channel of the fan is enough wide, and the air loss is too much, because there is a 90° bending too; second, if some water drops on the keyboard, the water can enter into the shell easily, and damage the electronic components inside.

In the present invention, the host stands up, the air inlet is opened at the back wall of the host shell, so it is not easily blocked; the fan can be pasted on the wall of the shell, the air inlet of the fan and the air inlet of the shell overlap, there is no inlet channel, so it saves the thickness of the inlet channel, and there is no bending of air inlet, so little the air loss.

The display and the host are combined in one: first, it saves the shell of the display screen and the necessary room between the display screen and the shell (for example, the room and the thickness of driving circuit of the display screen), and also the cost is cut down; second, there is no problem that the connecting wires between the display and the host any more.

The keyboard is set on the screen cover, first the whole structure is compact; second, there is no problem of concave distortion when a much high force acting on the keyboard; third, the keyboard needn't to be used for the air inlet for heat dissipation, so there are several structures can be chosen, such as the thin film key-press structure, the electric rubber key-press structure, they are not only low cost, but also small thickness.

The host stands up askew, so that users can have a good visual angle when watching the screen. The host with a display screen is heavier than a single display screen, when the host stands up, the center of gravity is so high that we should solve the problem of stability. The present invention uses the screen cover as the base of the host when the host stands up, the host stands on the inside of the screen cover, the vertical line of the gravity center is within the screen cover, so it solves the problem of stability, when the host stands up.

The screen cover is connected to the host with a linking device, the linking device can be a staff connecting structure, or the connecting structure of slide block and sliding groove. The host can stands on the inside wall of the screen cover conveniently, and the users can also fold the host and screen cover together conveniently, the screen cover covers the screen, and the whole structure is compact very much.

These and other objectives, features, and advantages of the present invention will become apparent in the following detailed description, the accompanying drawings and the appended claims.

BRIEF DESCRIPTION OF THE DRAWINGS

FIG. 1 is the drawing of a kind of the present invention, that the linking device is staff connecting and sustaining structure, showing the view of characteristic structure. FIG. 1a is one kind of sectional view along lines A-A, showing one kind of connection between the host and the staff.

FIG. 2 is the drawing of a kind of the present invention, that the linking device is staff connecting and sustaining structure, showing the section plane of characteristic structure.

DETAILED DESCRIPTION OF THE PREFERRED EMBODIMENT

Figure 3:
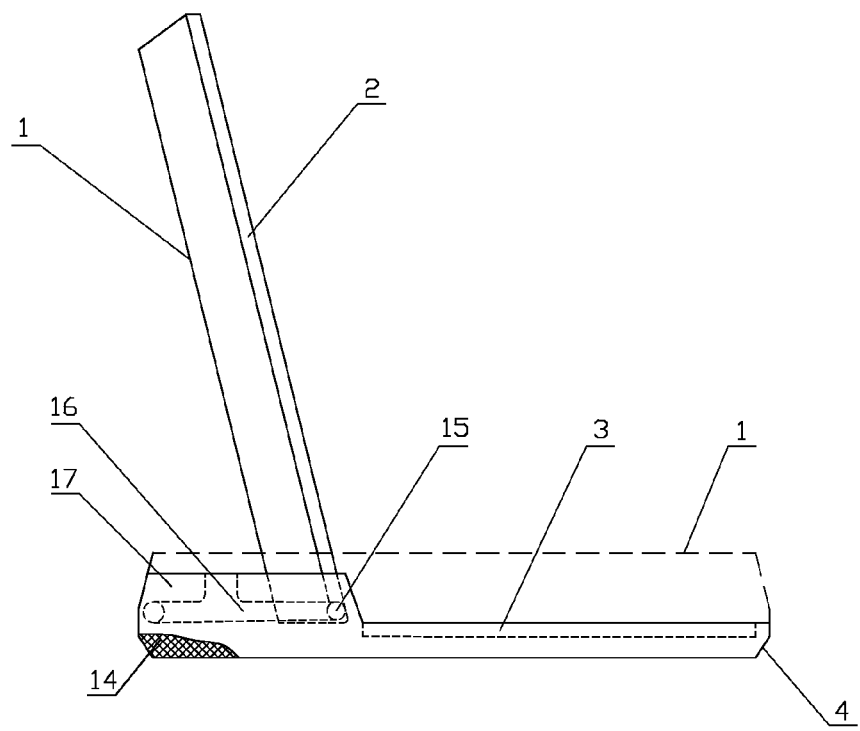
FIGS. 3, 6 and 8 are the drawings of three kind of the present invention respectively, that the linking device is slide block and sliding groove structure, showing the view of characteristic structure.

FIG. 1 shows one kind of the present invention, that the linking device is staff connecting structure, the staff not only combines the host and the screen cover together, but also sustains the host to stand up askew. In the figure, there are two staffs 5 at the two sides of the computer, one end of staff 5 is connected to the middle part of host 1; the other is connected to one end of screen cover 4. Host 1 stands up askew, and the vertical line of the gravity center is within the screen cover to make sure the host is stable.

The host standing up askew, it makes display screen lean upwards, so the users can have a good visual angel. Host 1 shown in the broken line represents that the host and screen cover 4 are folded together, screen cover 4 covers display screen 2, being a protecting cover, keyboard 3 is set on the inside of screen cover 4 (the upside in the figure). So the structure is compact, users can conveniently open the host and makes it stand up, or fold the host and screen cover together.

If staff 5 is designed to be flexed, or the connecting point of staff 5 at host 1 can shift, or there are several connecting points, so the host skew angle can be adjusted, which is convenient for users to adjust visual angle of display screen. For the electric connection between the host and the screen cover, we can set the wires in staff 5, directly linking from screen cover 4 into host 1. Or we can use the plug connection, for example, the connection plug 501 is mounted to staff 5, the jack 101 is in host 1, as FIG. 1a shows, this kind structure can realize the host being separated conveniently from the screen cover (as the dashed staff 5 and connection plug 501 in FIG. 1a show), users can separate the host and the screen cover and change the screen cover conveniently. If the screen is a touch screen, after removing the screen cover, the host becomes a panel computer, more handiness and more convenient, so users can have more choices.

The present invention shown in FIG. 2 also adopts the linking device of staff connecting structure, but staff 5 is at the center, so only one staff can sustain the host up. In the figure, there is a heat sink on CPU or GPU chip 9 on motherboard 8, and the air inlet of fan 12 of the heat sink faces air inlet 13 on the wall of host shell 10, there is no inlet channel when the air from outside into fan 12, as arrow 7 shows, so the air loss is little and the thickness is small; In FIG. 2, fin 11 is pasted on the wall of shell 10, heat from CPU or GPU chip 9 can be transferred to the wall of shell 10 by fin 11, so for CPU or GPU chip heat dissipation, there is not only the forced air convection heat dissipation which is made of fan 12 and fin 11, but also natural convection heat dissipation and radiation heat dissipation.

The computer can be designed as: the heat sink is standby, only when the heat dissipation of the cover wall isn't enough, and the CPU or GPU temperature is too high, the fan is started up, so we can reduce the fan working time and the noise. In the figure, CPU or GPU chip 9 is set near the downside in host 1, and there is an air outlet 6 at the upside, this kind setting of the air outlet at or near the upside of the host and the CPU or GPU chip near the downside structure, can make use of the spare room effectually, forming a pump effect like a chimney, to improve the air convection in the host, bring the host heat outside, make the other components in the host to be cooled, and improve the whole heat dissipation. The figure also shows that there is a battery 14 in the screen cover, the thickness is same to the keyboard, so the room in the screen cover can be used effectually.

Figure 4:
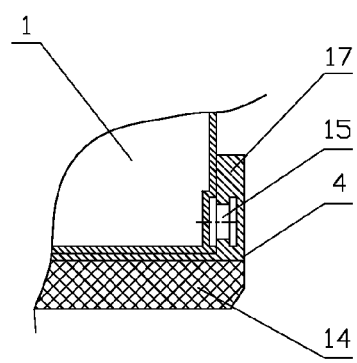
FIGS. 4 and 10 are the drawings of two kinds of the connecting structure of slide block and sliding groove respectively, showing the characteristic structure of the part section plane.

In the present invention as FIG. 3 shows, there is no staff, the linking device between host 1 and screen cover 4 is of slide block and sliding groove structure. There is a slide block 15 at host 1 downside and on the display screen side, there is a sliding groove 16 on vertical side 17 standing at the two sides of screen cover 4. FIG. 4 shows the characteristic structure of the connection between the slide block and the sliding groove, slide block 15 on host 1 is clamped in sliding groove 16, and it can slide in the sliding groove. In FIG. 3, the broken line showing host 1 represents the superposition state, slide block 15 on host 1 is at the top of sliding groove 16.

Figure 5:
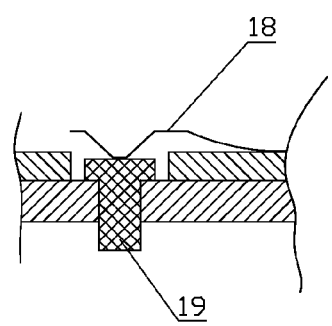
FIG. 5 is a drawing, showing the characteristic structure of the part section plane of the stretchy touch electric conduction structure.
Figure 7:
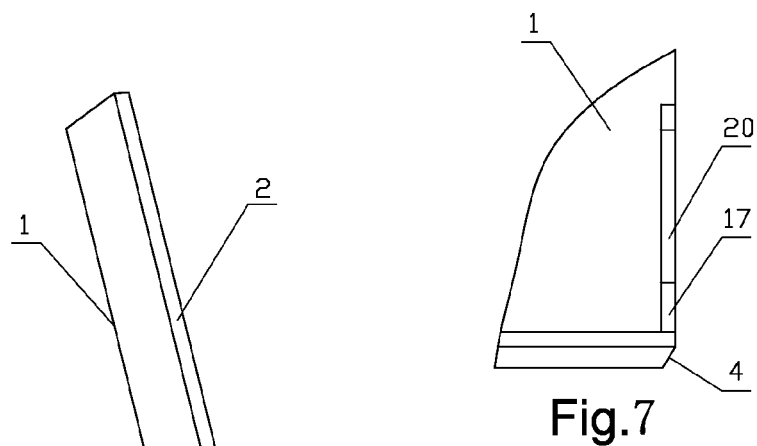
FIG. 7 is the part view of direction A of FIG. 6.

When host 1 stands up askew, slide block 15 is clamped in sliding groove 16 as a pivot of the host, the interface between the downside of host 1 and screen cover 4 is the other pivot, the two pivots make host 1 stand up askew. If the height of the interface between the host downside and screen cover 4 can be adjusted, the angle that host 1 stands up askew can be changed, so the visual angle of the display screen can be adjusted. The electric connection between host 1 and screen cover 4 can be the stretchy touch electric conduction structure, as FIG. 5 shown, the electric connection between host 1 and screen cover 4 can be achieved by the touch between electrode 19 on the screen cover and stretchy slice electrode 18 on the host. The stretchy touch is reliable for the electric connection between the two electrodes, and there is no wire in this kind electric connection.

In FIG. 3, there is an opening in sliding groove 16, from which slide block 15 can slide out, so host 1 can be separated from screen cover 4 conveniently. FIGS. 3 and 4 also show that there is battery 14 in screen cover 4. We can design the battery to be a whole block, whose out surface is the out surface of screen cover 4, as the FIG. 3 shows that the battery is on the outside of the screen cover, and the battery can be designed to be removed or installed conveniently, we also can make out different thicknesses (different capacities) of batteries for users to choose, which the notebook of now structure can't achieve.

The batteries that the mobile computer of the present invention needs, can be set in or not in the host base on different situations. The battery in the host can be the main battery, can also be backup battery. If setting the battery in the host as backup batteries, only when the battery in the screen cover are exhausted, or there is no battery in the screen cover, the backup battery begins to work, the advantages of this design include: first, it reduces the heat produced in the host, because when the battery working, they also produce heat; second, it delays the replacement of battery in the host.

Figure 6:
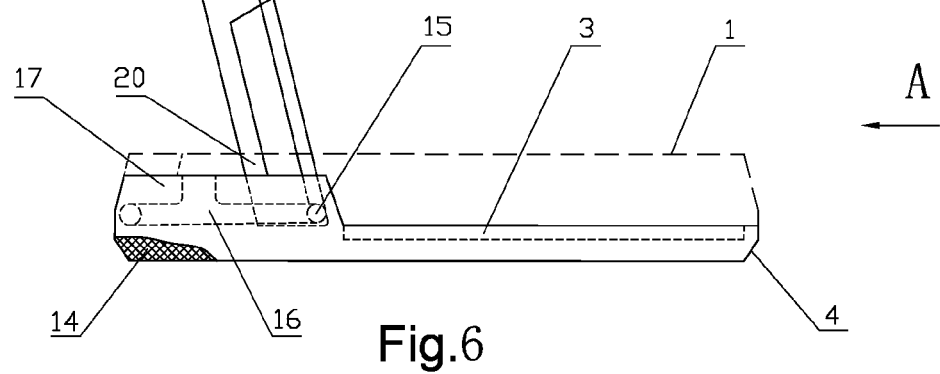
Figure 8:
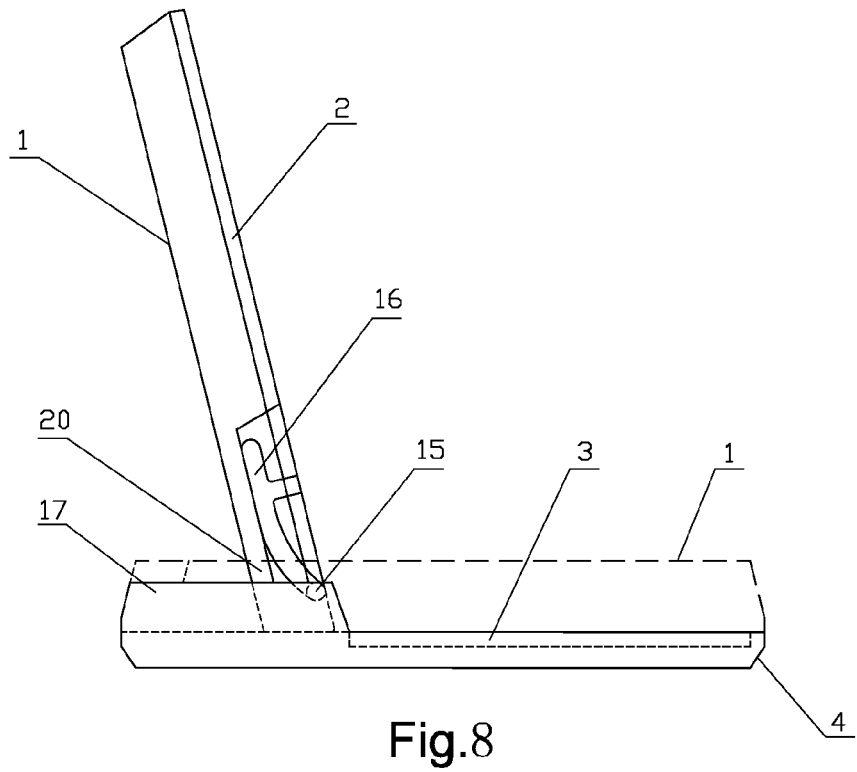

The present invention shown in FIG. 6 is similar to the one shown in FIG. 3, the linking device of slide block and sliding groove structure is adopted, the differences between them include: In FIG. 6, there is a bulge 20 on host 1, when the host stands up askew, the bulge 20 acts on vertical side 17 at the two sides of screen cover 4 to sustain the host up. If the position of bulge 20 can be adjusted, so the angle host 1 stands up askew can be adjusted, and the visual angle of the display screen can be adjusted. In FIGS. 3 and 6, the slide block is on the host and the sliding groove is on the screen cover, we can also have the slide block being on the screen cover, and the sliding groove being on the host, as FIG. 8 shown, and sliding groove 16 has an opening too, so we can easily separate the host from the screen cover.

Figure 9:
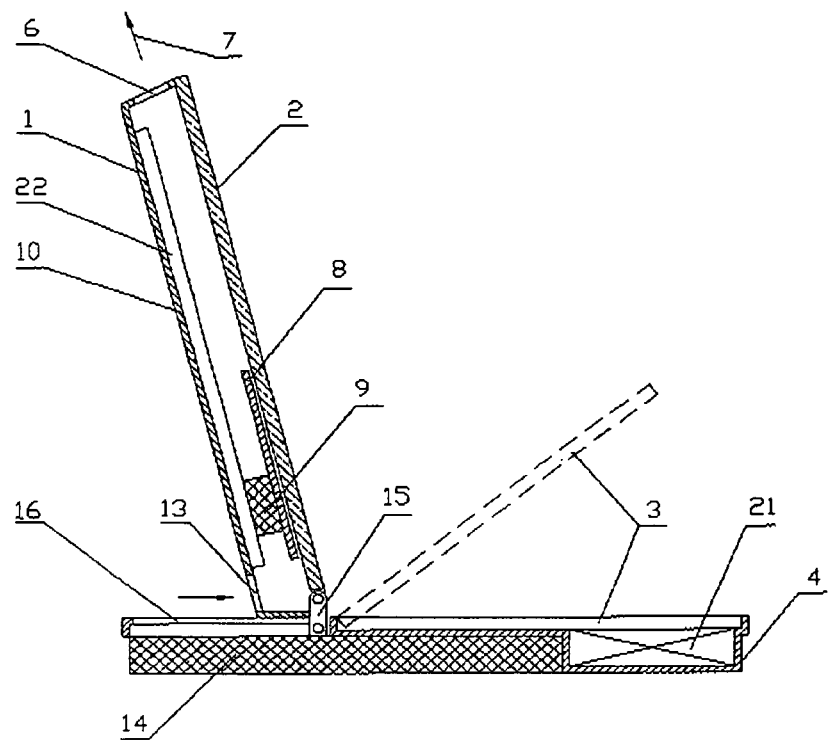
FIG. 9 is the characteristic structure sketch map of the section plane of one kind of the present invention that adopts the linking device of slide block and sliding groove structure.
Figures 10, 11:
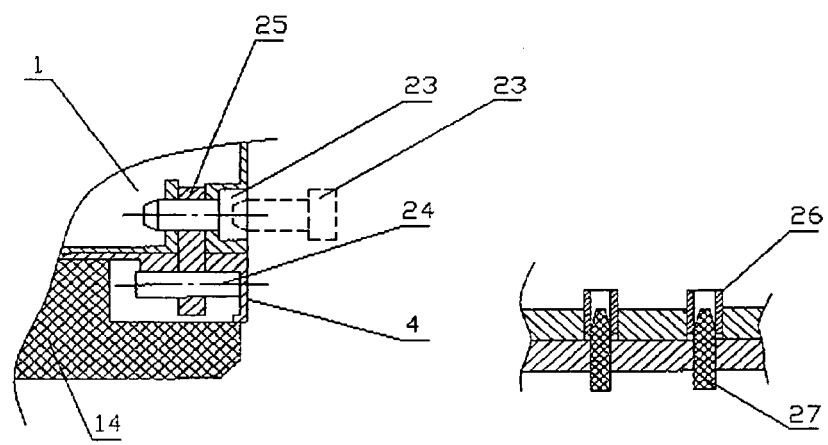
FIG. 11 is the characteristic structure sketch map of part section plane of a kind of the electric connector of concave electrode and convexity electrode structure.

The present invention shown in FIG. 9 also adopts the linking device of slide block and sliding groove structure. But the difference from the present invention shown in FIGS. 3 and 6, is that sliding groove 16 is set on the inside of screen cover 4 (the upside in the figure). As FIG. 10 shows, slide block 15 is made of linking block 25 and roller 24, slide block 15 is clamped in sliding groove 16 on screen cover 4, linking block 25 is inserted in host 1 and connected to host 1 by pin 23, as long as pin 23 being pull out (as the dashed pin 23 shows), host 1 can be separated from screen cover 4. There is a big battery 14 at the downside of screen cover 4.

In the host in FIG. 9, there is heat pipe 22, CPU or GPU chip 9 clings on heat pipe 22, which is set on the inside wall of host shell 10 to make the heat from CPU, GPU or other components be transferred uniformly to the whole surface of the shell and improve the heat dissipation. CPU or GPU chip 9 is set near the downside of host 1, it makes heat pipe 22 can be of simple gravity structure. The figure also shows, there is a CD-ROM in screen cover 4, CD-ROM 21 is set under keyboard 3, which is as the cover of the CD-ROM 21 and can be opened, as the broken line shown in the figure, after opening keyboard 3, we can take out or put in CD. Because CD can be directly put on the driver of CD-ROM, and be well located, so we can save the CD transferring and locating organs, and the structure will be simple and reliable, and the thickness of the CD-ROM can be decreased.

FIG. 11 shows a kind of the electric connector of concave electrode and convexity electrode structure, which is set at the interface between the host downside and screen cover when the host stands up. For example, convexity electrode 27 is set on the screen cover, and concave electrode 26 is on the host, when the host stands up askew on the screen cover, convexity electrode 27 is inserted into concave electrode 26. This structure can make sure the electric connection between the host and the screen cover effectually, and we also can use the cooperation between the concave electrode and the electrode convexity as the locating organ when the host stands up on the screen cover.

Especial note: the hard discs in the present invention include mechanism hard discs and solid state hard discs.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A mobile computer, comprising:
   a host which is a panel computer;
   a keyboard and a screen cover which is a cover covering the panel computer and having a backside edge,
   wherein said keyboard is set on the inside of said screen cover;
   wherein when said host is opened to stand up to be a keyboard trying position, the downside of the said host moves toward said keyboard and stands at the position between said keyboard and said backside edge of the said screen cover, said host stands up askew on the inside of said screen cover, said screen cover is the base of said host,
   wherein there is a battery set at the position between said keyboard and said backside edge of said screen cover, or
   there is a battery set underneath said keyboard and said battery extended beyond said keyboard towards said backside edge of said screen cover.

2. The mobile computer, as recited in claim 1, wherein the outside wall of said host shell is used as a heat dissipating surface of the CPU or GPU chip of said host, the heat dissipated from the outside wall of said host shell is transferred by a means of natural convection and radiation.

3. The mobile computer, as recited in claim 2, wherein said host and said screen cover are connected by a linking device, said linking device adopts a staff connecting structure, said staff is also used to sustain the host to stand up askew, wherein one end of said staff is connected to said host, the other is connected to said backside edge of said screen cover.

4. The mobile computer, as recited in claim 2, wherein said host and said screen cover are connected by a linking device, said linking device adopts a slide block and sliding groove connecting structure, said slide block and sliding groove connecting structure has a function for the downside of said host moving along said screen cover when said host being opened to be a keyboard tying position.

5. The mobile computer, as recited in claim 2, wherein there is a heat sink comprising a fan and fin, and there is an air inlet on said host shell, the air inlet of said fan faces said air inlet on said host shell, said fin is pasted on said host shell.

6. The mobile computer; as recited in claim 2, wherein there is a heat pipe on the inside wall of said host shell.

7. The mobile computer, as recited in claim 1, wherein said host and said screen cover are connected by a linking device, said linking device adopts a staff connecting structure, said staff is also used to sustain the host to stand up askew, wherein one end of said staff is connected to said host, the other is connected to said backside edge of said screen cover.

8. The mobile computer, as recited in claim 1, wherein said host and said screen cover are connected by a linking device, said linking device adopts a slide block and sliding groove connecting structure, said slide block and sliding groove connecting structure has a function for the downside of said host moving along said screen cover when said host being opened to be a keyboard tying position.

9. The mobile computer, as recited in claim 8, wherein said sliding groove is set on the inside of said screen cover.

10. The mobile computer, as recited in claim 8, wherein said sliding groove is set on said host.

11. The mobile computer, as recited in claim 8, wherein said sliding groove is set on the vertical side standing at the two sides of said screen cover.

12. The mobile computer, as recited in claim 1, wherein when said host stands up askew on said screen cover, an electrical connection is made at the interface between the down side of said host and said screen cover, said electrical connection has a stretchy touch electrical conduction structure.

13. The mobile computer, as recited in claim 1, wherein when said host stands up askew on said screen cover, an electrical connection is made at the interface between the down side of said host and said screen cover, said electrical connection has a concave electrode and convexity electrode structure.

* * * * *